Oct. 11, 1927. Re. 16,770

J. G. S. HALL

WEATHER STRIP

Original Filed July 19, 1926

Inventor:
John G. S. Hall
By: E. H. Lundy
Attys.

Reissued Oct. 11, 1927. Re. 16,770

UNITED STATES PATENT OFFICE.

JOHN G. S. HALL, OF CHICAGO, ILLINOIS.

WEATHER STRIP.

Original No. 1,628,665, dated May 17, 1927, Serial No. 123,300, filed July 19, 1926. Application for reissue filed June 18, 1927. Serial No. 199,833.

My present invention relates to weather-strips, and it has more particular reference to a structure of this character that may be made either with or without a molding piece of wood, metal or the like.

Weather-strips have been in a great number of forms, and a structure which is in demand consists of a wooden molding having a channeled edge or a recessed rear face, in which channel or recess there is inserted a strip of felt or the like which performs the cushioning function of the structure when installed upon doors, windows, and other closures.

Such weather stripping of course is short-lived for several reasons, among which is that, being subject to the natural elements, the felt decays and becomes useless, and when the doors and windows are painted these strips are usually painted, which causes the felt to harden and thereby lose its cushioning effect. The same inherent objections apply to weather-strip structures in which rubber or the like is substituted for the felt because the rubber will deteriorate much quicker than the felt. It has also been found that the felt affords an excellent nesting place for moths and other insects, the larvæ of which will consume a considerable quantity of the felt and thus destroy the usefulness of the weather strip.

With my present invention I have provided a length of flexible pliable material that is more or less form-retaining, and have enveloped the same in a covering made from waterproofed cloth or similar material, such material being commercially known as waterproof-sheeting or rubberized-sheeting. As exemplifying the flexible, pliable, form-retaining material I have shown a ribbon of felt or the like and the envelope is so made that it encloses and seals all of the felt ribbon, especially the exposed portion thereof so that there is little or no deterioration thereof due to climatic conditions, and at the same time the insects are excluded from access to the felt. The envelop is preferably sewn by stitches that pass entirely through all the layers or plies of the material. In this connection, the stitching of the material affords an excellent stay for the weather-strip when the same is used without a molding and assists in holding the structure tightly against the frame or closure upon which it is mounted, as will be pointed out in the following description.

I have numerous objects in mind, the first of which is to provide a weather-strip that may be economically and quickly made in large quantities so that it may be retailed for a low price. Another object resides in providing a weather-strip that may be made in continuous lengths, wound upon a spool and sold in any length desired by a customer, and when being applied to the window or door may be installed in a continuous manner so as to avoid cutting in several lengths for a desired installation. Also there is no waste in the use of a structure such as herein disclosed. Other objects reside in providing a device of this character that is novel in construction, dependable in operation, and which has inherent advantages over the structures now in favor.

I prefer to carry out my invention and to accomplish the divers objects in substantially the manner hereinafter described and as more particularly pointed out in the claims, reference being made to the accompanying drawings, that form a part of this specification.

In the drawings:

Figure 1 is an end edge view of a weather-strip made in accordance with my invention and shows a preferred manner of carrying out my invention.

Figures 2 to 7 inclusive are end edge views similar to Figure 1 showing modifications of the structure first illustrated.

The drawings are in a sense merely schematic for the purpose of illustrating preferred types of my invention, and in said drawings similar reference characters have been employed to designate the same parts wherever they appear throughout the several views.

Figure 1:
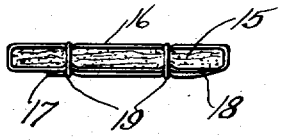

The structure illustrated in Figures 1, 8, 9 and 10 illustrate the preferred type that is shown to comprise a length of flexible pliable material that is more or less form-retaining that is herein exemplified as a ribbon or elongated flat piece of felt or similar fibrous material 15 that has inherent resilient cushioning characteristics and is flexible, pliable and may be compressed or compacted and will retain its normal shape when pressure is released. This felt ribbon is enclosed in an envelope 16 that is formed from waterproof and moistureproof fabric of a suitable width to surround and protect the felt from atmospheric and other foreign elements and from insects, and it will be noted that the longitudinal edges 17 and 18 of the envelope fabric overlap each other to quite an extent. The envelope may be secured to the felt ribbon and the edges secured down by cement or in any other suitable manner, but I prefer to secure these parts together by means of machine-sewn stitches 19, which latter in Figure 1 are shown as consisting of two parallel rows that are spaced inside the edges of the structure far enough to hold down the longitudinal edges of the envelope material. The stitches afford reinforcement against transverse movement of the strip when installed, as is hereinafter pointed out.

I prefer to employ for the envelop material the fabric commercially known as waterproof sheeting or rubberized-sheeting which may be readily cut into strips of the desired width, and the felt ribbon may also be cut the desired width from continuous sheets. This permits the weather-strip being manufactured upon machines of the multiple or "gang" type and in continuous lengths and such machines may be provided with slitting devices for cutting the strips of material as they are fed to the machine, and also with folders or "turners" for enclosing the felt ribbon in its waterproof fabric envelope. After leaving the machine the strips may be wound upon spools to contain several hundred feet thereof which is convenient to handle and store.

When being installed upon a window or door the workman need not measure the height and width of the opening and cut the required lengths, but need only start say at the lower left hand corner of the opening where he secures the end of the weather-strip by a suitable tack or nail 20, which is driven through the strip and into the frame, the location of the tack being in juxta-position to a row of stitches 19. The strip is new pulled taut and the next tack driven close to the same row of stitches and with the edge of the strip pressed towards or snugly into the corner formed by the meeting portion of the frame and closure. As the stitching is done with heavy thread the row adjacent which the tacks are driven acts as a tie or stay between the tacks and maintains this intermediate portion in position and prevents the same sagging or bulging away from the closure and structure to which it is secured.

Figure 2:
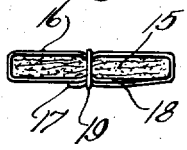

In Figure 2 the felt ribbon may be of less width than illustrated in Figure 1 and the longitudinal edges 17 and 18 of the fabric envelop do not overlap to the extent to which they are overlapped in Figure 1, and there is but a single row of stitches 19.

Figure 3:
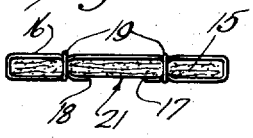

Figure 3 shows a type in which the longitudinal edges 17 and 18 of the fabric envelop do not overlap and there is a gap 21 formed in the unexposed portion of the weather-strip through which the surface of the felt ribbon is exposed, said edges being secured by the two stitched rows 19. This type is more particularly adapted for the use in combination with a molding as the glue or cement if applied to the edge and back of the unit will adhere to the wood molding in a more dependable manner.

Figure 4:
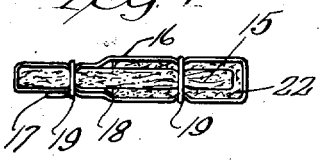

In Figure 4 I have shown the felt ribbon 15 as surrounded on one longitudinal edge with an additional ribbon of thinner and wider felt 22 that is folded longitudinally to fit over the ribbon 15 and may be of softer felt so as to increase the cushioning effect of the article.

Figure 5:
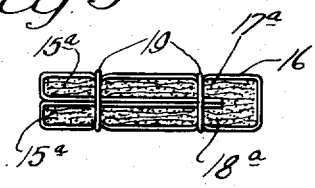

In some instances it may be desirable to employ a weather-strip of greater thickness than those previously described and for this purpose I provide the structure illustrated in Figure 5, wherein the ribbon $15^a$ is cut double width and a wider envelop strip 16 is made. The felt ribbon is placed flat upon the envelop sheet and the longitudinal edges $17^a$ and $18^a$ of the envelop are folded over the upper face of the ribbon until they substantially meet at the longitudinal center of the ribbon. The structure thus far assembled is then folded longitudinally upon itself with the edges $17^a$ and $18^a$ of the envelop innermost and the whole is then sewn together with the stitching 19.

Figure 6:
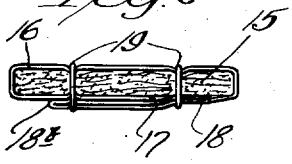

In the modification shown in Figure 6 the outer overlapping part of the envelop is formed by making a fold $18^b$ which will dispose the edge 18 inside the envelop and there will be no uncut edges left exposed.

Figure 7:
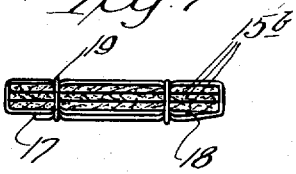
Figure 8:
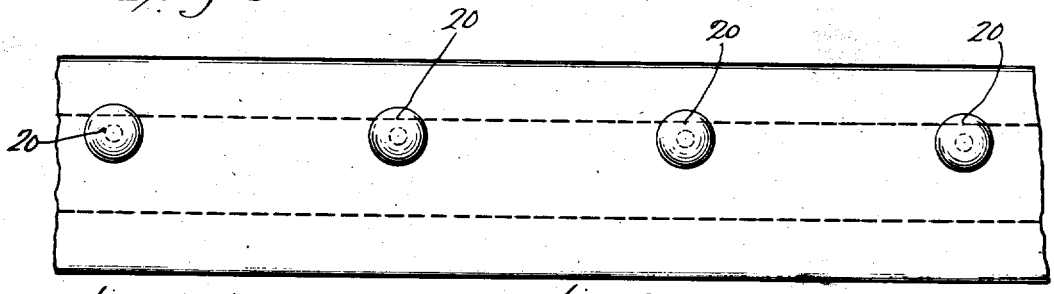
Figure 8 is a longitudinal plan of a length of my weather-strip showing the manner of installing the same.

For the purpose of providing a very soft structure I find this may be accomplished by superimposing several thin layers or plies of thin soft ribbon $15^b$ as shown in Figure 7, and then enclosing the same in an envelop similar to that of any of the types herein described, the one illustrated being that exemplified in Figure 1.

Figure 10:
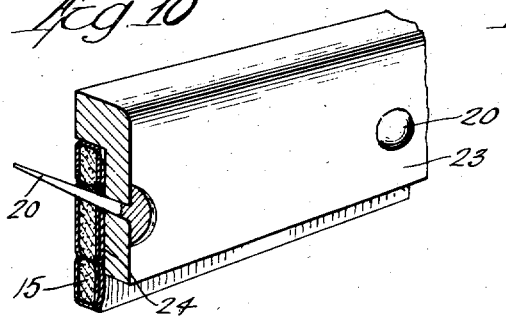
Figure 10 is a perspective view illustrating the manner of incorporating my weather-strip in a wooden molding and installing the same.
Figure 9:
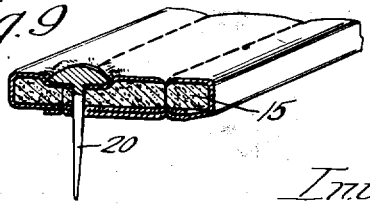
Figure 9 is a perspective view, with the forward end in transverse section of a fragmentary portion of the structure illustrated in Figure 8.

The weather-strip which I have described is capable of ready use by itself, and it may be combined with a wood or other molding 23 such as illustrated in Figure 10 which is provided upon its back or rear face with a longitudinal recess 24 that affords a seat in which the weather-strip unit may be secured by glue, cement, or any other suitable manner, and I desire it explicitly understood that I do not in anywise limit myself to a unit to be used in combination with a molding. It will also be appreciated that the unit may be made in other forms than those herein disclosed and employing a flat ribbon of felt or similar material with which a suitable fabric is employed, the felt ribbon being employed herein merely as an exemplification of a flexible, pliable, form-retaining material.

What I claim is:

1. A weather-strip adapted for edge contact in use comprising a flexible, pliable ribbon of fibrous material, a fabric strip folded around said fibrous ribbon and protecting the portion thereof that is exposed in use, the longitudinal edges of said strip lying flat against and parallel to said ribbon, and at least one of the longitudinal edges of the fabric strip adapted to receive attaching devices that are passed through the ribbon to mount the weather-strip, the relative disposition being such that a longitudinal edge of the ribbon is adapted to be engaged and compressed transversely against a structure opposing the member upon which the strip is mounted.

2. A weather-strip adapted for edge contact in use, comprising a flexible pliable ribbon of fibrous material, a fabric strip folded around said fibrous ribbon and protecting the portion thereof that is exposed in use, the longitudinal edges of said strip lying flat against and parallel to said ribbon, and stitching extending longitudinally of the structure and passed through the ribbon and fabric adjacent an edge of the latter, the stitching being at a location where attaching devices passed through the strip to mount the same will prevent lateral distortion of the strip, the relative disposition of said elements being such that a longitudinal edge of the strip is adapted to be engaged and compressed transversely against a structure opposing the member upon which the strip is mounted.

3. A weather-strip adapted for edge contact in use comprising a flexible pliable ribbon of fibrous material, a molding strip having a longitudinal seat in which said fibrous ribbon is secured, a fabric strip enclosing and protecting the exposed portion of the fibrous ribbon, with its longitudinal edges lying flat against and parallel to said fibrous ribbon and stitching passed through the fibrous ribbon and fabric strip adjacent an edge of the latter at a location where attaching devices passed through the weather-strip to mount the same will prevent lateral distortion of the ribbon and fabric strip, the relative disposition of said elements being such that a longitudinal edge of the ribbon is adapted to be engaged and compressed transversely against a structure opposing the member upon which the molding is mounted.

4. A weather-strip adapted for edge contact in use, comprising a length of flexible pliable fibrous material, a length of fabric enclosing and protecting the portion of said fibrous material that is exposed in use, and having its longitudinal edge portions arranged in contact, longitudinal stitching passed through the contacting portions of said fabric, and a molding having a longitudinal seat in which the aforesaid structure is secured, the relative disposition of said elements being such that attaching devices passed through the molding to mount the same will pierce the contacting portion of the fabric adjacent the stitching whereby to prevent bulging of the flexible elements, and the longitudinal edges of said flexible elements being adapted to be engaged and compressed transversely against a structure opposing the member upon which the molding is mounted.

5. A weather-strip adapted for edge contact in use comprising a length of flexible pliable material, a fabric strip folded around said material and protecting the portion thereof that is exposed in use, the longitudinal edges of said strip lying flat against and parallel to said material, and at least one of the longitudinal edges of the fabric strip adapted to receive attaching devices that are passed through the material to mount the weather-strip, the relative disposition being such that a longitudinal edge of the material is adapted to be engaged and compressed transversely against a structure opposing the member upon which the strip is mounted.

6. A weather-strip adapted for edge contact in use, comprising a length of flexible pliable material, a fabric strip folded around said material and protecting the portion thereof that is exposed in use, the longitudinal edges of said strip lying flat against and parallel to said material and stitching extending longitudinally of the structure and passed through the material and fabric adjacent an edge of the latter, the stitching being at a location where attaching devices passed through the strip to mount the same will prevent lateral distortion of the strip, the relative disposition of said elements being such that a longitudinal edge of the strip is adapted to be engaged and compressed transversely against a structure opposing the member upon which the strip is mounted.

7. A weather-strip adapted for edge contact in use, comprising a length of flexible pliable material, a molding strip having a longitudinal seat in which said material is secured, a fabric strip enclosing and protecting the exposed portion of the material, with its longitudinal edges lying flat against and parallel to said material, and stitching passed through the material and fabric strip adjacent an edge of the latter at a location where attaching devices passed through the weather strip to mount the same will prevent lateral distortion of the material and fabric strip, the relative disposition of said elements being such that a longitudinal edge of the material is adapted to be engaged and compressed transversely against a structure opposing the member upon which the molding is mounted.

8. A weather strip adapted for edge contact in use comprising a length of flexible pliable material, a length of fabric enclosing and protecting the portion of said material that is exposed in use, and having its longitudinal edge portions arranged in contact, longitudinal stitching passed through the contacting portions of said fabric, and a molding having a longitudinal seat in which the aforesaid structure is secured, the relative disposition of said elements being such that attaching devices passed through the molding to mount the same will pierce the contacting portion of the fabric adjacent the stitching whereby to prevent bulging of the flexible elements, and the longitudinal edges of said flexible elements being adapted to be engaged and compressed transversely against a structure opposing the member upon which the molding is mounted.

Signed at Chicago, in the county of Cook, and State of Illinois, this 16th day of June, 1927.

JOHN G. S. HALL.